No. 658,876. Patented Oct. 2, 1900.
J. C. W. STANLEY.
TREATMENT OF COTTON SEED.
(Application filed Mar. 28, 1900.)
(No Model.)
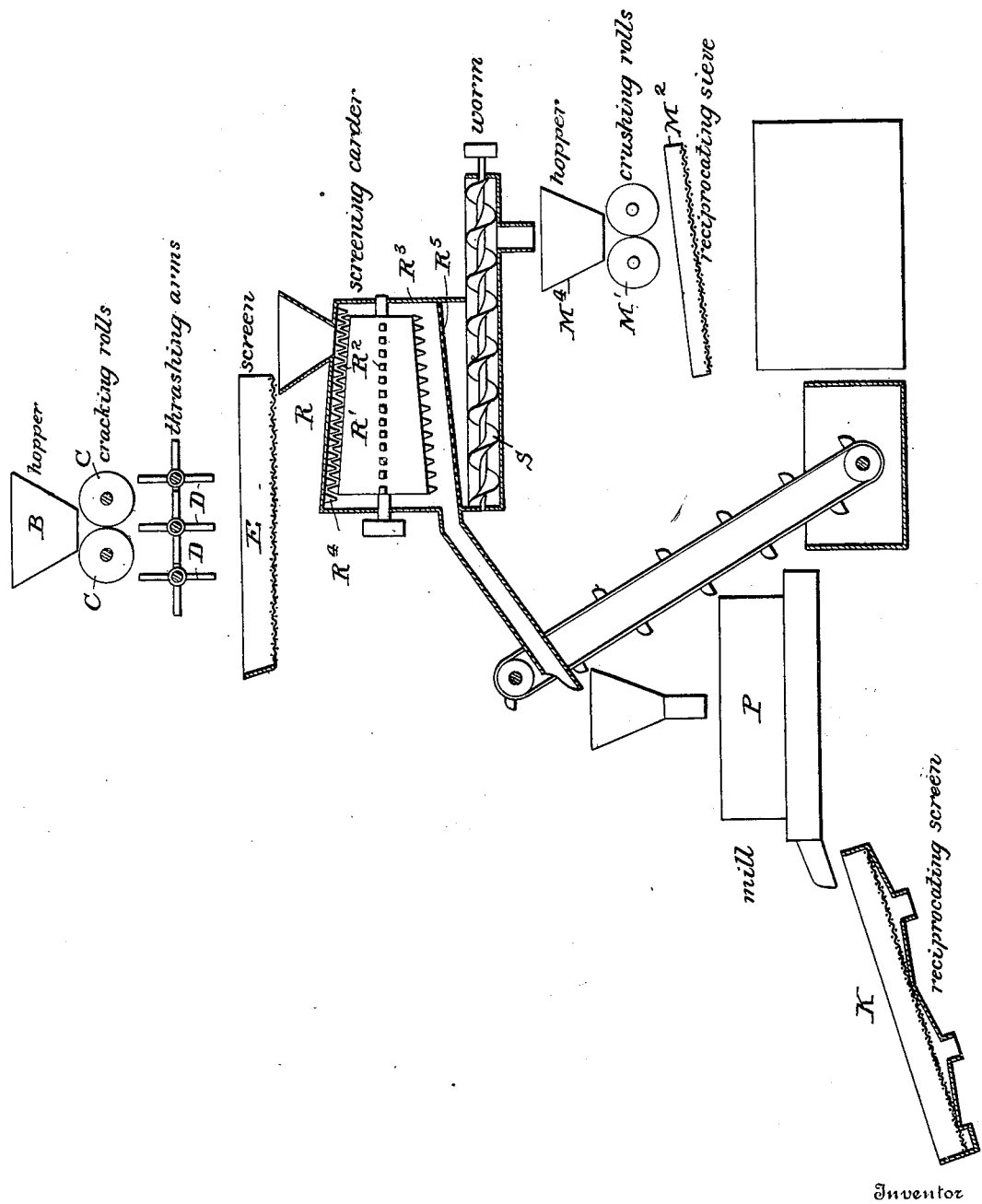

UNITED STATES PATENT OFFICE.

JOHN CHARLES WILLIAM STANLEY, OF LONDON, ENGLAND, ASSIGNOR TO THE COTTON SEED OIL SYNDICATE, LIMITED, OF SAME PLACE.

TREATMENT OF COTTON-SEED.

SPECIFICATION forming part of Letters Patent No. 658,876, dated October 2, 1900.

Application filed March 28, 1900. Serial No. 10,574. (No specimens.)

*To all whom it may concern:*

Be it known that I, JOHN CHARLES WILLIAM STANLEY, a subject of the Queen of England, residing at London, England, have invented certain new and useful Improvements in or Relating to the Treatment of Cotton-Seed, of which the following is a specification.

This invention relates to improvements in the treatment of cotton-seed after it has been removed from the outer pod and has had the greater portion of the cotton fibers removed from it. Such seed comprises the kernels, the husks or hulls, and generally cotton fibers adhering to the hulls.

The present invention relates particularly to the treatment of the hulls which are separated from the major portions of the kernels after the cotton-seeds have been cracked and disintegrated. To these hulls the major portion of the cotton will still adhere after such separation from the kernels, and small particles of the kernels will also still adhere to them.

The object of the invention is to take the hulls, as above indicated, and separate the small particles of kernel therefrom and after such separation reduce the hulls to meal and separate the cotton therefrom.

According to this invention the seed, after a preliminary sifting to separate from it any debris—such as, stones, sand, and the like—which may be present, is passed between rollers which crack or open the hulls. After passing the cracking-rollers the seed is threshed and is then screened, pieces of kernel and small fragments of hull passing through the screen, while the hulls, with the cotton and small particles of kernel adhering to them, remain as tailings. These tailings are passed to a carding-machine provided with a screen and hereinafter called a "screening-carder." The particles of the tailings travel through this machine in a compact mass and are constantly agitated with the result that the cotton fibers are opened and the fragments of kernel and small pieces of hull and cotton are separated from the main body of hulls and cotton and pass through the screen. Preferably there are two or more screening-carders and the tailings from one pass to the succeeding machine. The tailings from the screening-carder, which consist of hulls and most of the cotton, are ground, and the product is sifted upon the fine-meshed reciprocating sieve to separate the hull-meal from the cotton.

The accompanying drawing represents an arrangement of machinery which may be employed to carry out the process, some parts being in section.

Assuming the cotton-seed to have been freed from debris—such as stones, sand, and the like—such cleaned seed is fed to a hopper B, from whence it is fed to cracking-rolls C. In passing between these rolls the hulls will be cracked and opened and the kernels partially crushed. From the rolls C the cracked seed drops onto threshing-arms D, which are mounted upon parallel rotary shafts and intercalate. The function of the arms is to reduce the kernel to a finely-divided state and beat it out of the hull. From the arms D the seed passes to a reciprocating screen E, and most of the kernel and small fragments of hull and cotton will pass through the screen and be conveyed away for subsequent treatment. The tailings from the screen E, which consist of the major portion of the hulls and the cotton, together with small fragments of kernel adhering thereto, are fed into a screening-carder R, which forms the subject-matter of a separate application of even date herewith, Serial No. 10,575. Briefly stated, there is a rotary conical drum $R'$, carrying a series of rows of spikes or teeth $R^2$ upon its periphery. A casing $R^3$, concentric with the drum, partially surrounds it and is open at its lower portion. The casing is provided with rows of teeth or spikes $R^4$, arranged to intercalate with the teeth on the drum, and below the drum is a screen $R^5$. The tailings are fed to the small end of the drum between it and the casing $R^3$ and will work up toward the large end under the action of the teeth. In practice the entire space between the screen, the casing, and the drum will be constantly filled with tailings, or, in other words, the particles of the tailings will be in a compact mass, which will travel slowly through the screening-carder, and during such travel the particles will be kept constantly agitated and subjected to the carding action of the teeth until they tail off. The function of this screening-carder is to open the more or less interlaced fibers of cotton and release the fragments of kernel and small pieces of hull from their engagement with the large pieces of hull and the cotton. The fragments of kernel and small pieces of hull and some cotton sift through the screen and are conveyed away for subsequent treatment, to be further explained hereinafter. Preferably there will be more than one screening-carder employed, although only one is illustrated. When more than one is employed, each will tail off into the succeeding one. The tailings from the screening-carder, which consist only of hulls and cotton, are conveyed to a grinding-mill P. Here they are reduced to a finely-divided condition, and the ground product passes to a fine-meshed reciprocating screen K, the operation of which results in the sifting through of the hull-meal, while the cotton will remain on top of the screen and form into balls or rolls of fluff, which can readily be removed as desired. The fragments of kernels, small pieces of hull, and some cotton which sifts through the screen $R^5$ fall into a hopper or receptacle and are conveyed by a worm S to hopper $M^4$, from which they are fed to a pair of crushing-rollers $M'$ $M'$, and the crushed material falls upon a reciprocating sieve $M^2$. The kernel-meal and a little free cotton will pass through the sieve, and the pieces of hull and most of the cotton which will not be broken or crushed by the rollers will pass off the sieve $M^2$ as tailings and be conveyed to the grinding-mill P, which reduces them to a finely-divided condition, and the ground product passes to the screen K, which separates the hull-meal from the cotton, as before described. Obviously the tailings from the sieve $M^2$ could be conveyed to a separate grinding-mill, if preferred, but the result would be the same, and for convenience I have illustrated the tailings from the sieve $M^2$ and the screening-carder as being conveyed to the same grinding-mill.

Having described the invention, I claim—

1. A process for the treatment of cotton-seed, consisting in cracking and disintegrating the seed, roughly separating the kernels from the hulls and the cotton and kernel adhering to the hulls, then opening up the cotton on the hulls and separating the fragments of kernel, free cotton and small pieces of hull from the larger pieces of hull and adhering cotton, crushing the separated kernel, free cotton and hull, separating the kernel therefrom, reducing the hull and cotton to a finely-divided condition, and separating the cotton from the hull-meal, substantially as set forth.

2. A process for the treatment of cotton-seed, consisting in cracking and disintegrating the seed, roughly separating the kernels from the hulls and the cotton and kernel adhering to the hulls, then opening up the cotton on the hulls and separating the fragments of kernel, free cotton and small pieces of hull from the larger pieces of hull and adhering cotton, reducing the larger pieces of hull and adhering cotton to a finely-divided condition, and separating the cotton from the hull-meal, substantially as set forth.

3. A process for the treatment of cotton-seed, consisting in cracking and disintegrating the seed, roughly separating the kernels from the hulls and the cotton and kernel adhering to the hulls, then opening up the cotton on the hulls and separating the fragments of kernel, free cotton and small pieces of hull from the larger pieces of hull and adhering cotton, crushing the separated kernel, free cotton and hull, separating the kernel therefrom, reducing the hull and cotton to a finely-divided condition, separating the cotton from the hull-meal, reducing the larger pieces of hull and adhering cotton to a finely-divided condition, and separating the cotton from the hull meal, substantially as set forth.

4. In the treatment of the tailings from disintegrated cotton-seed, comprising hulls with adhering fiber and small fragments of kernel, subjecting the particles of such tailings while in a compact mass to agitation to detach the kernels from the hull and fiber, and then separating the kernels, hull and free fiber, substantially as set forth.

5. In the treatment of the tailings from disintegrated cotton-seed, comprising hulls with adhering fiber and small fragments of kernel, causing the particles of such tailings to travel in a compact mass, and at the same time agitating them to detach the kernels from the hull and fiber, and then separating the kernels, hull and free fiber, substantially as set forth.

In testimony whereof I have signed my name to this specification in the presence of two subscribing witnesses.

JOHN CHARLES WILLIAM STANLEY.

Witnesses:
A. H. GREENWOOD,
W. M. HARRIS.